US008962746B2

(12) United States Patent
Hergenrother et al.

(10) Patent No.: US 8,962,746 B2
(45) Date of Patent: Feb. 24, 2015

(54) METHODS OF MAKING BLOCKED-MERCAPTO ALKOXY-MODIFIED SILSESQUIOXANE COMPOUNDS

(75) Inventors: William L. Hergenrother, Akron, OH (US); Chenchy Jeffrey Lin, Hudson, OH (US); James H. Pawlow, Akron, OH (US); Terrence E. Hogan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 65 days.

(21) Appl. No.: 12/344,804

(22) Filed: Dec. 29, 2008

(65) Prior Publication Data
US 2009/0171014 A1  Jul. 2, 2009

Related U.S. Application Data

(60) Provisional application No. 61/016,893, filed on Dec. 27, 2007.

(51) Int. Cl.
| *C08L 83/06* | (2006.01) |
| *C08G 77/06* | (2006.01) |
| *C08G 77/392* | (2006.01) |
| *C08G 77/04* | (2006.01) |
| *C08G 77/28* | (2006.01) |
| *C08K 5/548* | (2006.01) |
| *C08L 9/06* | (2006.01) |
| *C08K 5/56* | (2006.01) |
| *C08L 9/00* | (2006.01) |

(52) U.S. Cl.
CPC .............. *C08G 77/392* (2013.01); *C08G 77/04* (2013.01); *C08G 77/28* (2013.01); *C08K 5/548* (2013.01); *C08L 9/06* (2013.01); C08K 5/56 (2013.01); C08L 9/00 (2013.01)
USPC ................ 524/588; 528/15; 528/24; 528/29

(58) Field of Classification Search
CPC ....... C08K 5/548; C08G 77/04; C08G 77/392
USPC .................................. 524/588; 528/15, 24, 29
See application file for complete search history.

(56) References Cited

U.S. PATENT DOCUMENTS

| 2,462,640 A | 2/1949 | Hyde |
| 3,186,965 A | 6/1965 | Plueddemanu |
| 3,304,318 A | 2/1967 | Brady |
| 3,428,706 A | 2/1969 | Walmsley et al. |
| 3,647,740 A | 3/1972 | Loree et al. |
| 3,734,763 A | 5/1973 | Plueddemann |
| 3,816,493 A | 6/1974 | Nitzsche et al. |
| 4,052,524 A | 10/1977 | Harakas et al. |
| 4,101,460 A | 7/1978 | Small et al. |
| 4,258,770 A | 3/1981 | Davis et al. |
| 4,269,741 A | 5/1981 | Hornan |
| 4,340,515 A | 7/1982 | Frassek et al. |
| 4,424,297 A | 1/1984 | Bey |
| 4,441,946 A | 4/1984 | Sharma |
| 4,512,897 A | 4/1985 | Crowder, III et al. |
| 4,694,040 A | 9/1987 | Hashimoto et al. |
| 4,745,145 A | 5/1988 | Schofeld et al. |
| 4,822,681 A | 4/1989 | Schossler et al. |
| 4,847,162 A * | 7/1989 | Haluska et al. ............... 428/457 |
| 4,889,747 A | 12/1989 | Wilson |
| 5,015,717 A | 5/1991 | Martin et al. |
| 5,162,409 A | 11/1992 | Mroczkowski |
| 5,359,022 A | 10/1994 | Mautner et al. |
| 5,363,994 A | 11/1994 | Angeline |
| 5,447,971 A | 9/1995 | Bergh et al. |
| 5,484,867 A | 1/1996 | Lichtenhan et al. |
| 5,534,592 A | 7/1996 | Halasa et al. |
| 5,552,476 A | 9/1996 | Halling |
| 5,650,474 A | 7/1997 | Yamaya et al. |
| 5,684,113 A | 11/1997 | Nakanishi et al. |
| 5,750,197 A | 5/1998 | van Ooij et al. |
| 5,750,610 A | 5/1998 | Burns et al. |
| 5,763,388 A | 6/1998 | Lightsey et al. |
| 5,830,934 A | 11/1998 | Krishnan |
| 5,844,060 A | 12/1998 | Furuya et al. |
| 5,854,369 A | 12/1998 | Geck et al. |
| 5,907,015 A | 5/1999 | Sexsmith |
| 5,914,364 A | 6/1999 | Cohen et al. |
| 5,916,973 A | 6/1999 | Zimmer et al. |
| 5,929,149 A | 7/1999 | Matsuo et al. |
| 5,932,757 A | 8/1999 | Standke et al. |

(Continued)

FOREIGN PATENT DOCUMENTS

| CN | 101180344 A | 5/2008 |
| EP | 0025840 A1 | 4/1981 |

(Continued)

OTHER PUBLICATIONS

Zimmer, Marc S., Nov. 20, 2009 Final Office Action from U.S. Appl. No. 11/387,569 (6 pp.).
Boiling Point Calculator from the web site http://www.partyman.se/boiling-point-calculator, downloaded Nov. 10, 2009 (2pp.).
Boiling Point Calculator from the web site http://www.trimen.pl/witek/calculators/wrzenie.html, downloaded Nov. 10, 2009 (2 pp.).
Brown, Jr., John F. et al., "The Polycondensation of Phyenlsilanetriol", Journal of the American Chemical Society, vol. 87, No. 19, pp. 4317-4324 (Oct. 5, 1965).

(Continued)

Primary Examiner — Mark Eashoo
Assistant Examiner — Michael A Salvitti
(74) Attorney, Agent, or Firm — Meredith Hooker; Nathan Lewis

(57) ABSTRACT

Methods of forming blocked-mercapto alkoxy-modified silsesquioxanes are provided. The blocked-mercapto alkoxy-modified silsesquioxane compounds contain an alkoxysilane group that participates in an alkoxysilane-silica reaction as a silica dispersing agent in rubber, with the release of zero to about 0.1% by weight of the rubber as alcohol (a volatile organic compound (VOC)), during compounding and further processing. The blocked-mercapto alkoxy-modified silsesquioxane compounds also contain a blocked mercapto group which, when de-blocked, allows the mercapto group to interact with the polymer(s) in a rubber composition. Further described are rubber compounds containing the blocked-mercapto alkoxy-modified silsesquioxanes.

19 Claims, No Drawings

(56) References Cited

U.S. PATENT DOCUMENTS

| | | |
|---|---|---|
| 5,958,161 A | 9/1999 | Grimberg et al. |
| 5,969,057 A | 10/1999 | Schoeley et al. |
| 5,985,371 A | 11/1999 | Fujioka et al. |
| 5,985,953 A | 11/1999 | Lightsey et al. |
| 6,015,850 A | 1/2000 | Nakamura et al. |
| 6,033,597 A | 3/2000 | Yatsuyanagi et al. |
| 6,048,910 A | 4/2000 | Furuya et al. |
| 6,087,519 A | 7/2000 | Garnier et al. |
| 6,124,491 A | 9/2000 | Wotler et al. |
| 6,127,468 A | 10/2000 | Cruse et al. |
| 6,140,447 A | 10/2000 | Gay et al. |
| 6,162,547 A | 12/2000 | van Ooji et al. |
| 6,191,247 B1 | 2/2001 | Ishikawa et al. |
| 6,204,339 B1 | 3/2001 | Waldman et al. |
| 6,232,424 B1 | 5/2001 | Zhong et al. |
| 6,239,243 B1 | 5/2001 | Deng et al. |
| 6,271,331 B1 | 8/2001 | Gay et al. |
| 6,294,007 B1 | 9/2001 | Martin |
| 6,313,205 B1 | 11/2001 | Chiron et al. |
| 6,326,424 B1 | 12/2001 | Louis et al. |
| 6,331,605 B1 | 12/2001 | Lunginsland et al. |
| 6,361,871 B1 | 3/2002 | Jenkner et al. |
| 6,372,843 B1 | 4/2002 | Barruel et al. |
| 6,399,210 B1 | 6/2002 | Zhong |
| 6,414,061 B1 | 7/2002 | Cruse et al. |
| 6,426,378 B1 | 7/2002 | Lickes et al. |
| 6,429,245 B1 | 8/2002 | Francik et al. |
| 6,433,065 B1 | 8/2002 | Lin et al. |
| 6,433,077 B1 | 8/2002 | Craig et al. |
| 6,455,158 B1 | 9/2002 | Mei et al. |
| 6,465,670 B2 | 10/2002 | Thise et al. |
| 6,465,671 B1 | 10/2002 | Bae et al. |
| 6,528,673 B2 | 3/2003 | Cruse et al. |
| 6,548,573 B1 | 4/2003 | Rempert |
| 6,548,594 B2 | 4/2003 | Luginsland et al. |
| 6,573,356 B2 | 6/2003 | Araki et al. |
| 6,608,125 B2 | 8/2003 | Cruse et al. |
| 6,611,518 B1 | 8/2003 | Ngo et al. |
| 6,624,214 B2 | 9/2003 | Zimmer et al. |
| 6,624,237 B2 | 9/2003 | Biteau et al. |
| 6,635,700 B2 | 10/2003 | Cruse et al. |
| 6,649,684 B1 | 11/2003 | Okel |
| 6,653,365 B2 | 11/2003 | Jia |
| 6,660,823 B1 | 12/2003 | Lichtenhan et al. |
| 6,683,135 B2 | 1/2004 | Cruse et al. |
| 6,689,834 B2 | 2/2004 | Ackermann et al. |
| 6,696,155 B1 | 2/2004 | Takano et al. |
| 6,727,339 B2 | 4/2004 | Luginsland et al. |
| 6,767,930 B1 * | 7/2004 | Svejda et al. ............... 521/134 |
| 6,770,724 B1 | 8/2004 | Lichtenhan et al. |
| 6,774,202 B2 | 8/2004 | Lee |
| 6,774,569 B2 | 8/2004 | de Vries et al. |
| 6,811,684 B2 | 11/2004 | Mohr et al. |
| 6,821,632 B2 | 11/2004 | Topp et al. |
| 6,830,826 B2 | 12/2004 | Brabant et al. |
| 6,841,197 B2 | 1/2005 | Standke et al. |
| 6,852,794 B2 | 2/2005 | Puhala et al. |
| 6,878,768 B2 | 4/2005 | Tardivat et al. |
| 6,890,981 B1 | 5/2005 | Luginsland |
| 6,903,150 B2 | 6/2005 | Zimmer et al. |
| 6,911,518 B2 | 6/2005 | Lichtenhan et al. |
| 6,919,469 B2 | 7/2005 | Van Ooij et al. |
| 6,927,270 B2 | 8/2005 | Lichtenhan et al. |
| 6,936,663 B1 | 8/2005 | Modisette |
| 6,972,312 B1 | 12/2005 | Lichtenhan et al. |
| 7,119,150 B2 | 10/2006 | Lin et al. |
| 7,201,944 B2 | 4/2007 | Hergenrother et al. |
| 7,294,669 B2 | 11/2007 | Ito |
| 7,393,564 B2 | 7/2008 | Hergenrother et al. |
| 7,432,321 B2 * | 10/2008 | Joshi et al. ............... 524/492 |
| 7,550,547 B2 | 6/2009 | Wakabayashi et al. |
| 7,732,016 B2 | 6/2010 | van Ooij et al. |
| 7,799,780 B2 | 9/2010 | Herold et al. |
| 7,799,870 B2 * | 9/2010 | Hergenrother et al. ....... 525/100 |
| 7,915,368 B2 | 3/2011 | Hergenrother et al. |
| 8,029,906 B2 | 10/2011 | van Ooij et al. |
| 8,097,674 B2 | 1/2012 | Hergenrother et al. |
| 8,288,474 B2 | 10/2012 | Hergenrother et al. |
| 8,513,371 B2 | 8/2013 | Hergenrother et al. |
| 8,642,691 B2 | 2/2014 | Hergenrother et al. |
| 8,809,481 B2 | 8/2014 | Hergenrother et al. |
| 8,822,620 B2 | 9/2014 | Hergenrother et al. |
| 2001/0011046 A1 | 8/2001 | Ichikawa et al. |
| 2002/0055011 A1 | 5/2002 | Brabant et al. |
| 2002/0055564 A1 | 5/2002 | Cruse et al. |
| 2002/0061409 A1 | 5/2002 | Topp et al. |
| 2002/0151616 A1 | 10/2002 | Ozai et al. |
| 2003/0055193 A1 | 3/2003 | Lichtenhan et al. |
| 2003/0059393 A1 | 3/2003 | Wrolson et al. |
| 2003/0088034 A1 | 5/2003 | Luginsland et al. |
| 2003/0114601 A1 | 6/2003 | Cruse et al. |
| 2003/0130388 A1 | 7/2003 | Luginsland et al. |
| 2003/0199619 A1 * | 10/2003 | Cruse ............... 524/261 |
| 2004/0042880 A1 | 3/2004 | Lee |
| 2004/0042980 A1 | 3/2004 | Kanji et al. |
| 2004/0122180 A1 | 6/2004 | Hergenrother et al. |
| 2004/0210001 A1 | 10/2004 | Cruse et al. |
| 2004/0266968 A1 | 12/2004 | Korth et al. |
| 2005/0009982 A1 * | 1/2005 | Inagaki et al. ............... 524/588 |
| 2005/0010012 A1 | 1/2005 | Jost et al. |
| 2005/0079364 A1 | 4/2005 | van Ooij et al. |
| 2005/0244659 A1 | 11/2005 | Higuchi et al. |
| 2005/0277717 A1 * | 12/2005 | Joshi et al. ............... 524/261 |
| 2006/0083925 A1 * | 4/2006 | Laine et al. ............... 428/405 |
| 2006/0086450 A1 | 4/2006 | Hogan et al. |
| 2006/0089446 A1 | 4/2006 | Lin et al. |
| 2006/0089504 A1 | 4/2006 | Ito et al. |
| 2006/0115657 A1 | 6/2006 | Griswold |
| 2006/0147731 A1 | 7/2006 | Grimberg et al. |
| 2006/0210813 A1 | 9/2006 | Fath et al. |
| 2006/0217473 A1 * | 9/2006 | Hergenrother et al. ....... 524/261 |
| 2007/0059448 A1 | 3/2007 | Smith et al. |
| 2007/0275255 A1 * | 11/2007 | Ooms et al. ............... 428/447 |
| 2008/0293858 A1 | 11/2008 | Hergenrother et al. |
| 2009/0005481 A1 | 1/2009 | Ishida et al. |
| 2009/0165913 A1 | 7/2009 | Hergenrother et al. |
| 2009/0181248 A1 | 7/2009 | van Ooij et al. |
| 2009/0203929 A1 | 8/2009 | Hergenrother et al. |
| 2009/0326255 A1 | 12/2009 | Hergenrother et al. |
| 2010/0071818 A1 | 3/2010 | Hergenrother et al. |

FOREIGN PATENT DOCUMENTS

| | | |
|---|---|---|
| EP | 1995267 A2 | 11/2008 |
| JP | 6306173 A | 11/1994 |
| JP | 7292108 A | 11/1995 |
| JP | 08155287 A | 6/1996 |
| JP | 10001549 | 1/1998 |
| JP | 10059984 A | 3/1998 |
| JP | 10292048 A | 11/1998 |
| JP | 11343366 | 12/1999 |
| JP | 2001-205187 A | 7/2001 |
| JP | 2002-138164 | 5/2002 |
| JP | 2004-521992 A | 7/2004 |
| JP | 2005-029771 A | 2/2005 |
| JP | 2006137821 A | 6/2006 |
| JP | 2006285017 A | 10/2006 |
| JP | 2007008987 A | 1/2007 |
| KR | 20020078721 A | 10/2002 |
| WO | 0224826 A1 | 3/2002 |
| WO | 03091314 A1 | 11/2003 |
| WO | 2005-093002 | 10/2005 |
| WO | WO 2006/031434 * | 3/2006 |
| WO | 2006102518 A1 | 9/2006 |
| WO | 2008-025846 | 3/2008 |
| WO | 2009-085181 | 7/2009 |

OTHER PUBLICATIONS

Dittmar, Uwe et al., "Funktionalisierte Octa-(propylsilsesquioxane)(3-XC$_3$H$_6$)$_8$(Si$_8$O$_{12}$) Modellverbindungen fur oberflachenmodifizierte Kieselgele", Journal of Organometallic Chemistry, 489 pp. 185-194, (1995) [with English translation].

(56) References Cited

OTHER PUBLICATIONS

Joshi, Mangala et al., "Polymeric Nanocomposites—Polyhedral Oligomeric Silsesquioxanes (POSS) as Hybrid Nanofiller", Journal of Macromolecular Science, Part C—Polymer Reviews, vol. 44, No. 4, pp. 389-410 (2004).
Rikowski, Eckhard et al., "Cage-rearrangement of silsesquioxanes", Polyhedron, vol. 16, No. 19, pp. 3357-3361 (1997).
Product brochure, Gelest, Inc., "PolySilsesquioxanes and T-Resins $RSiO_{1.5}$", pp. 39-42, (2004).
Buestrich, R., Jul. 24, 2006 International Search Report from PCT Patent Application No. PCT/US2006/010610 (2 pp.).
Dzhafarov, A.A. et al., "Synthesis and Properties of Organosilicon, Organogermanium, and Organotin Compounds [2-(Arylthio)Ethyl]-Silanes,—Germanes, and—Stannanes", Kalinin State University, Institute of Oil-Additive Chemistry, Academy of Sciences of the Azerbaidzhan SSR. Translated from Zhurnal Obshchei Khimii, vol. 45, No. 9, pp. 2023-2025, Sep. 1975.
van Ooij, W.J., "Mechanism and Theories of Rubber Adhesion to Steel Tire Cords", Rubber Chemistry and Technology, vol. 57, No. 3, pp. 421-456 (1984).
Hergenrother, William L. et al., U.S. Appl. No. 12/346,994, filed Dec. 31, 2008 entitled "Amino Alkoxy-Modified Silsesquioxanes and Method of Preparation".
Hergenrother, William L. et al., U.S. Appl. No. 12/347,017, filed Dec. 31, 2008 entitled "Amino Alkoxy-Modified Silsesquioxanes in Silica-Filled Rubber With Low Volatile Organic Chemical Evolution".
Hergenrother, William L. et al., U.S. Appl. No. 12/347,047, filed Dec. 31, 2008 entitled "Method for Making Alkoxy-Modified Silsesquioxanes and Amino Alkoxy-Modified Silsesquioxanes".
Hergenrother, William L. et al., U.S. Appl. No. 12/347,086, filed Dec. 31, 2008 entitled "Amino Alkoxy-Modified Silsesquioxane Adhesives for Improved Metal Adhesion and Metal Adhesion Retention to Cured Rubber".
Zimmer, Marc S., Jun. 26, 2009 Office Action from U.S. Appl. No. 11/387,569 (6 pp.).
Nuss, A.J. et al., Decision of Technical Board of Appeal 3.3.1 dated Feb. 12, 1998, T990/96-3.3.1 (pp. 1-12).
Yu, Libing et al., "Preparation, Characterization, and Synthetic Uses of Lanthanide (III) Catalysts Supported on Ion Exchange Resins", J. Org. Chem., vol. 62, No. 11, pp. 3575-3581 (1997).
Database WPI Week 200026, Thomson Scientific, London, GB; AN 2000-298587, XP-002573380, & JP2000-086766, Mar. 28, 2000 (2 pp.).
Buestrich, Ralf, Apr. 15, 2008 Office Action from corresponding European Patent Application No. 06739416.3 (3 pp.).
Buestrich, Ralf, Aug. 17, 2009 Office Action from corresponding European Patent Application No. 06739416.3 (4 pp.).
Peng, Kuo Liang, May 18, 2010 Office Action from corresponding U.S. Appl. No. 11/752,715 (7 pp.).
Hergenrother, William L. et al., "Reduction of Volatile Organic Compound Emission. I. Synthesis and Characterization of Alkoxy-Modified Silsesquioxane", Journal of Applied Polymer Science, vol. 115, pp. 79-90 (2010).
Nazina, Elena E., Mar. 22, 2010 Office Action from corresponding Russian Patent Application No. 2007139319 (6 pp.).
Cho, Han Sol, Apr. 20, 2010 International Search Report from PCT/US2009/069587 (4 pp.).
Xue, Haijiao, English translation of Apr. 27, 2010 First Office Action from corresponding Chinese Patent Application No. 200680018058.2 (11 pp.).
Zimmer, Marc S., Oct. 5, 2010 Office Action from corresponding U.S. Appl. No. 12/347,017 (10 pp.).
Peng, Kuo Liang, Nov. 18, 2010 Notice of Allowance from corresponding U.S. Appl. No. 11/752,715 (5 pp.).
Zimmer, Marc S., Apr. 21, 2011 Notice of Allowance from corresponding U.S. Appl. No. 12/347,017 (5 pp.).
Peng, KuoLiang, May 11, 2011 Office Action from U.S. Appl. No. 12/347,047 (8 pp.).
Xue, Haijiao, May 19, 2011 Office Action with English translation from Chinese Patent Application No. 200680018058.2 (9 pp.).
Peng, KuoLiang, Jun. 16, 2011 Office Action from U.S. Appl. No. 12/346,994 (10 pp.).
Peng, Kuo Liang, Nov. 17, 2011 Final Office Action from U.S. Appl. No. 12/347,047 (10 pp.).
Peng, Kuo Liang, Nov. 18, 2011 Final Office Action from U.S. Appl. No. 12/346,994 (10 pp.).
Sheh, Anthony H., Feb. 6, 2012 Office Action from U.S. Appl. No. 12/347,086 (12 pp.).
Kamimura, N., English translation of Feb. 7, 2012 Office Action from Japanese Patent Application No. 2008-503194 (7 pp.).
Peng, Kuo Liang, Mar. 1, 2012 Office Action from U.S. Appl. No. 12/347,047 (7 pp.).
Peng, Kuo Liang, Mar. 2, 2012 Office Action from U.S. Appl. No. 12/346,994 (8 pp.).
Peng, Kuo Liang, Mar. 22, 2012 Office Action from U.S. Appl. No. 13/030,611 (7 pp.).
Jin, Ma, English translation of Apr. 5, 2012 Office Action from Chinese Application No. 200810214703.9 (5 pp.).
English translation of Apr. 6, 2012 of Action from Chinese Application No. 200910161911.1 (7 pp.).
Buestrich, Ralf, Apr. 23, 2012 Office Action from European Patent Application No. 10075613.9 (6 pp.).
Buestrich, Ralf, Apr. 24, 2012 Office Action from European Patent Application No. 06739416.3 (6 pp.).
Zimmer, Marc S., Jun. 21, 2012 Notice of Allowance from U.S. Appl. No. 12/883,778 (4 pp.).
Loewe, Robert S., Jun. 25, 2012 Office Action from U.S. Appl. No. 13/174,129 (7 pp.).
Peng, Kuo Liang, Aug. 6, 2012 Office Action from U.S. Appl. No. 13/030,611 (11 pp.).
Peng, Kuo Liang, Aug. 9, 2012 Final Office Action from U.S. Appl. No. 12/347,047 (7 pp.).
Baney, Ronald H. et al., "Silsesquioxanes," Chem. Rev. vol. 95, pp. 1409-1430 (1995).
Li, Guizhi et al., "Polyhedral Oligomeric Silsesquioxane (POSS) Polymers and Copolymers: A Review," Journal of Inorganic and Organometallic Polymers, vol. 11, No. 3, pp. 123-154 (2002).
Zimmer, Marc S., Feb. 15, 2012 Office Action from U.S. Appl. No. 12/883,778 (8 pp.).
Oct. 12, 2012 Office Action with English translation from Chinese Application No. 200910161911.1 (9 pp.).
Loewe, Robert S., Oct. 15, 2012 Final Office Action from U.S. Appl. No. 13/174,129 (8 pp.).
Jin, Ma, Jan. 6, 2013 Office Action with English translation from Chinese Application No. 200810214703.9 (6 pp.).
Loewe, Robert S., Jan. 31, 2013 Office Action from U.S. Appl. No. 13/174,129 (8 pp.).
Kamimura, N., Feb. 5, 2013 Office Action with English translation from Japanese Application No. 2008-503194 (7 pp.).
Mar. 4, 2013 Office Action with English translation from Chinese Application No. 200980157744.1 (16 pp.).
Grubb, W.T., "A Rate Study of the Silanol Condensation Reaction at 25 degrees in Alcoholic Solvents," J. Am. Chem. Soc., 76, pp. 3408-3414 (1954).
Peng, Kuo Liang, Apr. 10, 2013 Notice of Allowance from U.S. Appl. No. 12/346,994 (10 pp.).
Peng, Kuo Liang, Apr. 12, 2013 Office Action from U.S. Appl. No. 13/030,611 (11 pp.).
Shinawaga, Yoko, May 7, 2013 Office Action with English translation from Japanese Application No. 2008-134163 (9 pp.).
Loewe, Robert S., May 9, 2013 Office Action from U.S. Appl. No. 13/174,129 (6 pp.).
Chinese Patent Office, May 30, 2013 Office Action with English translation from Chinese Application No. 200910161911.1 (8 pp.).
Barrere, Matthieu, May 31, 2013 European Search Report from European Application No. 09837079.4 (8 pp.).
Loewe, Robert S., Aug. 16, 2013 Advisory Action from U.S. Appl. No. 13/174,129 (3 pp.).
Kitazawa, K., Sep. 17, 2013 Office Action with English translation from Japanese Application No. 2009-182924 (8 pp.).

(56) References Cited

OTHER PUBLICATIONS

Peng, Kuo Liang, Sep. 18, 2013 Notice of Allowance from U.S. Appl. No. 13/030,611 (5 pp.).
Shinawaga, Y., Oct. 8, 2013 Office Action with English translation from Japanese Application No. 2008-134163 (5 pp.).
Chinese Patent Office, Nov. 7, 2013 Office Action with English translation from Chinese Application No. 200910161911.1 (8 pp.).
Zimmer, Marc S., Nov. 20, 2013 Office Action from U.S. Appl. No. 13/652,271 (8 pp.).
Azumi, T., Office Action with English Translation for Japanese Patent Application No. 2011544559, Mailed Date: Jan. 28, 2014, 9 pages.
Egwim, Kelechi, Notice of Allowance for U.S. Appl. No. 12/347,086, Mailed Date: Mar. 6, 2014, 5 pages.
Peng, Kuo-Liang, Office Action for U.S. Appl. No. 13/030,611, Mailed Date: Dec. 30, 2013, 10 pages.
Peng, Kuo-Liang, Notice of Allowance and Fees Due for U.S. Appl. No. 13/030,611, Mailed Date: Apr. 24, 2014, 9 pages.
Peng, Kuo-Liang, Notice of Allowance and Fees Due for U.S. Appl. No. 13/970,328, Mailed Date: Mar. 31, 2014, 13 pages.
Zimmer, Marc, Office Action Summary for U.S. Appl. No. 13/652,271, Mailed Date: Apr. 17, 2014, 10 pages.
Zimmer, Marc, Advisory Action Before the Filing of an Appeal Brief for U.S. Appl. No. 13/652,271, Mailed Date: Jul. 28, 2014, 3 pages.
Office Action for European Patent Application No. 08009287.7, Mailed Date: Sep. 19, 2014, 6 pages.
Chakrabarti, et al., "Cationic Ion Exchange Resins as Catalyst," Reactive Polymers, Elsevier Science Publishers B.V., vol. 20, 1993, pp. 1-45.
Wheaton, et al., "DOWEX Ion Exchange Resins—Fundamentals of Ion Exchange," Dow Liquid Separations, XP-002606300, 9 pages.
Zimmer, Marc S., Oct. 20, 2014 Office Action from U.S. Appl. No. 13/652,271 (19 pp.).
Machine Translation of JP 10-001549.

* cited by examiner

METHODS OF MAKING BLOCKED-MERCAPTO ALKOXY-MODIFIED SILSESQUIOXANE COMPOUNDS

This application claims priority to U.S. Provisional Patent Application No. 61/016,893, filed Dec. 27, 2007.

FIELD OF THE DISCLOSURE

This technology generally relates to blocked-mercapto alkoxy-modified silsesquioxane compounds and the use of such compounds in vulcanizable elastomeric compounds containing silica as a reinforcing filler.

BACKGROUND

As the present trend in tire-making technology continues toward the use of higher silica loadings in rubber compounds, there is a challenge to contain levels of environmentally released alcohol as a volatile organic compound (VOC) during compounding, processing, curing and storage of silica-reinforced rubber compounds.

In our U.S. patent application Ser. No. 11/387,569, filed Mar. 23, 2006, entitled "Compounding Silica-Reinforced Rubber With Low Volatile Organic Compound (VOC) Emission," the entire disclosure of which is hereby incorporated by reference, we describe the preparation of alkoxy-modified silsesquioxane (AMS) compounds and co-alkoxy-modified silsesquioxane (co-AMS) compounds that generate less alcohol than conventional alkoxysilane-containing silica-coupling and/or silica dispersing agents used in rubber compounding. The decreased amount of alcohol produced when using the AMS and co-AMS compounds potentially results in vulcanized rubber compounds having one or more improved properties such as, but not limited to, enhanced rubber reinforcement, increased polymer-filler interaction and lower compound viscosity, providing for tires having improved wet and snow traction, lower rolling resistance and decreased hysteresis.

An exemplary co-AMS disclosed in the aforementioned patent application is a blocked-mercapto AMS. As disclosed therein, a blocked-mercapto AMS may be produced by the co-hydrolysis and co-condensation of an alkyltrialkoxysilane or an alkyltrichlorosilane with, for example, a blocked-mercaptoalkyltrialkoxysilane. Another blocked-mercapto AMS disclosed therein is an acetyl-blocked-mercapto AMS. The acetyl blocking group can be introduced, for example, by reacting thioacetic acid with an AMS produced from alkyltrichlorosilane reactants. However, care must be taken to avoid a pH above 7 for any length of time during the reaction to avoid gelled AMS.

Novel and non-obvious alternative methods of synthesizing blocked-mercapto AMS compounds are provided herein. Moreover, an alternative method for introducing an acetyl blocking group on an AMS compound is provided.

SUMMARY

Methods for making blocked-mercapto alkoxy-modified silsesquioxane compounds are described herein.

In one embodiment, a method of forming a blocked-mercapto alkoxy-modified silsesquioxane comprises combining:

a. one or more compounds selected from the group consisting of alkoxy-modified silsesquioxanes having the formula I

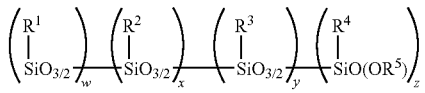

b. a compound having the formula II

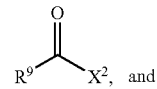

c. an acid scavenger.

In formula I, w, x, y and z represent mole fractions, z does not equal zero, w, x, or y but not all can be zero, and w+x+y+z=1.00. $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, (iv) $R^6X^1$, and (v) $R^6X^1R^7Z$. $X^1$ is selected from the group consisting of Cl, Br, SH, $S_aR^8$, $NR^8_2$, $OR^8$, $CO_2H$, $SCOR^8$, $CO_2R^8$, OH, olefins, epoxides, amino groups, vinyl groups, acrylates and methacrylates, where a=1 to about 8, and Z is independently selected from NH, $NR^8$, O, and S. At least one of $R^1$, $R^2$, $R^3$ and $R^4$ is $R^6X^1$ where $X^1$ is SH. $R^6$ is selected from the group consisting of alkylene groups having one to about 20 carbon atoms, cycloalkylene groups having 3 to about 20 carbon atoms, and a single bond. $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms. $R^7$ is selected from alkyl groups having one to about 6 carbon atoms.

In formula II, $R^9$ is selected from the group consisting of alkyl groups having one to about 20 carbon atoms, cycloalkyl groups having 3 to about 20 carbon atoms, alkylaryl groups having 7 to about 20 carbon atoms, and $OR^8$. $X^2$ is selected from the group consisting of $CO_2R^8$ and halogen. $R^8$ is described above in reference to formula I.

In a second embodiment, a method of forming a blocked-mercapto alkoxy-modified silsesquioxane comprises combining:

a. one or more compounds selected from the group consisting of alkoxy-modified silsesquioxanes having the formula III

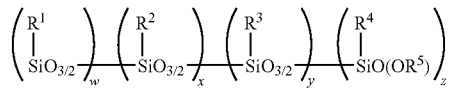

b. an unsaturated blocked mercapto compound, and
c. a reaction catalyst.

In formula III, w, x, y and z represent mole fractions, z does not equal zero, w, x, or y but not all can be zero, and w+x+y+z=1.00. $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, (iv) $R^6X^1$, and (v) $R^6X^1R^7Z$. $X^1$ is selected from the group consisting of Cl, Br, SH, $S_aR^8$, $NR^8{}_2$, $OR^8$, $CO_2H$, $SCOR^8$, $CO_2R^8$, OH, olefins, epoxides, amino groups, vinyl groups, acrylates and methacrylates, where a=1 to about 8, and Z is independently selected from NH, $NR^8$, O, and S. At least one of $R^1$, $R^2$, $R^3$ and $R^4$ is H. $R^6$ is selected from the group consisting of alkylene groups having one to about 20 carbon atoms, cycloalkylene groups having 3 to about 20 carbon atoms, and a single bond. $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms. $R^7$ is selected from alkyl groups having one to about 6 carbon atoms.

In a third embodiment, a method of forming a blocked-mercapto alkoxy-modified silsesquioxane comprises combining:

a. one or more compounds selected from the group consisting of alkoxy-modified silsesquioxanes having the formula IV

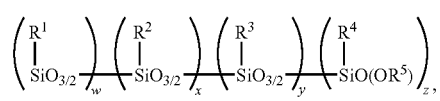

IV b. one or more compounds having the formula V

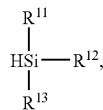

V and c. a reaction catalyst.

In formula IV, w, x, y and z represent mole fractions, z does not equal zero, w, x, or y but not all can be zero, and w+x+y+z=1.00. $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, (iv) $R^6X^1$, and (v) $R^6X^1R^7Z$. $X^1$ is selected from the group consisting of Cl, Br, SH, $S_aR^8$, $NR^8{}_2$, $OR^8$, $CO_2H$, $SCOR^8$, $CO_2R^8$, OH, olefins, epoxides, amino groups, vinyl groups, acrylates and methacrylates, where a=1 to about 8, and Z is independently selected from NH, $NR^8$, O, and S. At least one of $R^1$, $R^2$, $R^3$ and $R^4$ is $R^6X^1$ where $X^1$ is a vinyl group. $R^6$ is selected from the group consisting of alkylene groups having one to about 20 carbon atoms, cycloalkylene groups having 3 to about 20 carbon atoms, and a single bond. $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms. $R^7$ is selected from alkyl groups having one to about 6 carbon atoms.

In formula V, $R^{11}$, $R^{12}$ and $R^{13}$ are the same or different and selected from the group consisting of alkyl groups having one to about 20 carbon atoms, cycloalkyl groups having 3 to about 20 carbon atoms, alkylaryl groups having 7 to about 20 carbon atoms, and $R^6B$. B is a blocked mercapto compound, and at least one of $R^{11}$, $R^{12}$ and $R^{13}$ is $R^6B$.

Rubber compositions containing an elastomer, a reinforcing filler comprising silica or a mixture thereof with carbon black, and a blocked-mercapto alkoxy-modified silsesquioxane produced by the above methods are also provided.

As used herein, the terms "rubber composition(s)" and "rubber compound(s)" are used interchangeably.

DETAILED DESCRIPTION

In a first embodiment, a blocked-mercapto alkoxy-modified silsesquioxane is formed by a process comprising combining:

a. one or more compounds selected from the group consisting of alkoxy-modified silsesquioxanes having the formula I

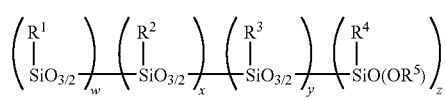

I b. a compound having the formula II

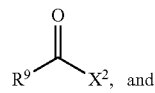

II c. an acid scavenger, wherein w, x, y and z represent mole fractions, z does not equal zero, w, x, or y but not all can be zero, and w+x+y+z=1.00; wherein $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, (iv) $R^6X^1$, and (v) $R^6X^1R^7Z$; wherein $X^1$ is selected from the group consisting of Cl, Br, SH, $S_aR^8$, $NR^8{}_2$, $OR^8$, $CO_2H$, $SCOR^8$, $CO_2R^8$, OH, olefins, epoxides, amino groups, vinyl groups, acrylates and methacrylates; wherein at least one of $R^1$, $R^2$, $R^3$ and $R^4$ is $R^6X^1$ where $X^1$ is SH; wherein a=1 to about 8; Z is independently selected from NH, $NR^8$, O, and S; $R^6$ is selected from the group consisting of alkylene groups having one to about 20 carbon atoms, cycloalkylene groups having 3 to about 20 carbon atoms, and a single bond; $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms; $R^7$ is selected from alkyl groups having one to about 6 carbon atoms; $R^9$ is selected from the group consisting of alkyl groups having one to about 20 carbon atoms, cycloalkyl groups having 3 to about 20 carbon atoms, alkylaryl groups having 7 to about 20 carbon atoms, and $OR^8$; and $X^2$ is selected from the group consisting $CO_2R^8$ and halogen.

In general, the alkoxy-modified silsesquioxane compound of Formula I can be made by subjecting alkyltrialkoxysilane(s) or alkyltrichlorosilane(s) to hydrolysis and condensation in an aqueous alcohol solution in the presence of a hydrolysis and condensation catalyst. The reaction is continued for a period of time sufficient for substantially total conversion of the alkyltrialkoxysilane(s) or alkyltrichlorosilane(s) to the alkoxy-modified silsesquioxane compound(s). It has been found that controlling the amounts of water in the reaction mixture can speed the conversion of the reactants to the final product. The alkoxy-modified silsesquioxane product is then removed from the reaction mixture by phase separation, and any remaining alkoxy-modified silsesquioxane product in the reaction mixture can be extracted with water and an organic solvent such as, but not limited to, cyclohexane and the like. The alkoxy-modified silsesquioxane product can then be dried in a warm vacuum oven, to remove substantially any alcohol and water remaining in the reaction mixture. The resulting product is a liquid or solid, preferably a highly viscous liquid, substantially free of moisture and of free alcohol.

A suitable method for preparing the alkoxy-modified silsesquioxane compound(s) of Formula I is described in the examples below. This method is also disclosed in our U.S. patent application Ser. No. 11/387,569.

Suitable hydrolysis and condensation catalysts for use in making the alkoxy-modified silsesquioxane compounds of Formula I are known and include, but are not limited to, strong acids such as hydrochloric acid, sulfuric acid, phosphoric acid and the like, strong bases such as sodium hydroxide, potassium hydroxide, lithium hydroxide and the like, and strong organic acids and bases, such as (1,8-diazabicyclo [5.4.0]undec-7-ene), imidazoles, guanidines and the like, and various tin and titanium compounds, known to those skilled in the art. Strong acid catalysts are particularly suitable for use in making the alkoxy-modified silsesquioxane compounds. The amount of the catalyst used is based upon the desired effective rate of the reaction. It will be recognized that when an alkyltrichlorosilane is used as the reactant, the addition of water to the reaction mixture will result in the production of hydrochloric acid, so no additional catalyst need be added to maintain the reaction.

The temperature at which the reaction takes place is not critical. For example, almost identical yields of alkoxy-modified silsesquioxane compound of Formula I can be obtained from ambient temperatures (about 25° C.) to about 60° C. to about 100° C. The alkoxy-modified silsesquioxane compound can be observed as a cloudy residue that, if desired, can be progressively removed from the reaction mixture over a period of time until there is substantially total conversion of the reactants to the alkoxy-modified silsesquioxane compound of Formula I. Moreover, during the reaction, additional amounts of the alkyltrialkoxysilane or alkyltrichlorosilane reactants can be added, with water, to continuously yield product.

The period of time for substantially total conversion of the reactants to the alkoxy-modified silsesquioxane compound of Formula I depends on the original concentration of the reactants and the optional addition of reactants and/or applied heat during the process. However, if no additional reactants are used, the time can range from about 0.5 hours to about 200 hours, often about 0.75 hours to about 120 hours, or about one hour to about 72 hours. The time for substantially total conversion is defined as the time elapsed until no further product can be removed by phase separation and no further product can be extracted from the reaction mixture by water and organic solvent, as described above.

Exemplary alkyltrialkoxysilane reactants useful in making the alkoxy-modified silsesquioxane compounds of Formula I can include, but are not limited to, octyltriethoxysilane, octyltrimethoxysilane, cyclohexyltriethoxysilane, isobutyltriethoxysilane, ethyltrimethoxysilane, cyclohexyltributoxysilane, methyl-triethoxysilane, propyltriethoxysilane, hexyltriethoxysilane, heptyltriethoxysilane, nonyl-triethoxysilane, decyltriethoxysilane, n-dodecyltrialkoxysilane, octadecyltriethoxysilane, methyltrimethoxysilane, propyltrimethoxysilane, hexyltrimethoxysilane, heptyl-trimethoxysilane, nonyltrimethoxysilane, octadecyl-trimethoxysilane, 2-ethylhexyl-triethoxysilane, 3-mercaptopropyl trimethoxy silane, 3-mercaptopropyl triethoxy silane, 3-aminopropyl trimethoxy silane, 3-aminopropyl triethoxy silane, N-[3-(trimethoxysilyl)-propyl]ethylenediamine, N-[3-(triethoxysilyl)-propyl]ethylenediamine, and the like, and mixtures thereof.

Exemplary alkyltrichlorosilane reactants for making the alkoxy-modified silsesquioxane compounds of Formula I can include, but are not limited to, octyltrichlorosilane, cyclohexyltrichlorosilane, isobutyltrichlorosilane, ethyltrichlorosilane, methyltrichlorosilane, propyltrichlorosilane, hexyltrichlorosilane, heptyltrichlorosilane, nonyltrichlorosilane, octadecyltrichlorosilane, and the like, and mixtures thereof.

At least one of $R^1$, $R^2$, $R^3$ and $R^4$ in the alkoxy-modified silsesquioxane of Formula I comprises an $R^6SH$ group. The SH group can be incorporated into the alkoxy-modified silsesquioxane of Formula I, for example, by the co-hydrolysis and co-condensation of an alkyltrialkoxysilane or an alkyltrichlorosilane with, for example, a mercaptoalkyltrialkoxysilane to introduce a mercaptoalkyl functionality. Exemplary mercaptoalkyltrialkoxysilanes include, but are not limited to, 3-mercaptopropyl trimethoxy silane, 3-mercaptopropyl triethoxy silane, 3-aminopropyl trimethoxy silane, 3-aminopropyl triethoxy silane, and the like, and mixtures thereof.

The alkoxy-modified silsesquioxane of Formula I is usually a mixture of oligomers of all sizes, from which one or more compounds of specific size or molecular weight can be separated from the mixture by known methods, such as chromatography and the like. Suitably, these one or more compounds are alkoxy-modified silsesquioxanes. For example, such alkoxy-modified silsesquioxanes can include, but are not limited to, octyl alkoxy-modified silsesquioxanes, phenyl alkoxy-modified silsesquioxanes, 2-chloropropyl alkoxy-modified silsesquioxanes, 2-mercaptopropyl alkoxy-modified silsesquioxanes, and the like, and mixtures of any of these.

A feature of the alkoxy-modified silsesquioxane of Formula I is the presence of a reactive alkoxysilyl group "z" attached to one or more alkoxy-modified silsesquioxane "w", "x", and/or "y" groups. In the alkoxy-modified silsesquioxane of Formula I, any of w, x or y, but not all, can be zero. The mole fraction of the one or more w, x, y or z groups is calculated as the mole fraction of w, x, y or z divided by the sum of the mole fractions w+x+y+z. Suitably, ratios of the w mole fraction (or the ratio of the x, y, or z mole fraction) to the sum of the w+x+y+z fraction can range from about 0.01 to about 0.995. The mole fractions of w, x, y and z also can be measured through the mole fractions of $R^1$, $R^2$, $R^3$ and $R^4$ if the relative abundance of those groups can be measured. The sum of the mole fractions w, x, y and z is always equal to one, and z is never zero.

The individual weight fractions of w, x, y and z can be calculated from the mole fraction of each times their respective formula weight (FW) divided by the sum of the individual w, x, y and z weight fractions. For example, the weight percent of x (W%(x)) is calculated as $$W\ \%(x) = \frac{x(FW_x)}{x(FW_x) + w(FW_w) + y(FW_y) + z(FW_z)} \times 100$$

The weight percent of alcohol ($HOR^5$) can be calculated by the formula $$W\ \%(HOR^5) = \frac{3(FW_{HOR^5})}{x(FW_x) + w(FW_w) + y(FW_y) + z(FW_z)} \times 100$$

To make a blocked-mercapto alkoxy-modified silsesquioxane according to a first embodiment, the alkoxy-modified silsesquioxane of Formula I is reacted with a compound having the formula II and an acid scavenger:

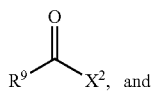

where $R^9$ is selected from the group consisting of alkyl groups having one to about 20 carbon atoms, cycloalkyl groups having 3 to about 20 carbon atoms, alkylaryl groups having 7 to about 20 carbon atoms, and $OR^8$; $R^8$ is selected from the group consisting of alkyl groups having one to about 20 carbon atoms, cycloalkyl groups having 3 to about 20 carbon atoms, and alkylaryl groups having 7 to about 20 carbon atoms; and $X^2$ is selected from the group consisting $CO_2R^8$ and halogen.

Exemplary compounds according to Formula II include, but are not limited to, acetic anhydride, acetyl chloride, benzoyl chloride, isobutyl chloroformate, and the like, and mixtures thereof.

The amount of compound according to Formula II added to the mixture containing the alkoxy-modified silsesquioxane may be from about 0.3 to about 1.2, alternatively from about 0.4 to about 1.1, or alternatively from about 0.5 to about 1.0 moles per mole of SH groups present in Formula I.

As mentioned above, an acid scavenger is added to the alkoxy-modified silsesquioxane of Formula I and the compound of Formula II. As used herein, an acid scavenger is any compound that reacts with a proton. Exemplary acid scavengers include, but are not limited to, triethylamine, sodium carbonate, and the like, and mixtures thereof.

The amount of acid scavenger to be added may range from about 1.0 to about 2.0, alternatively from about 1.05 to about 1.5, or alternatively from about 1.1 to about 1.4 moles per mole of SH groups present in Formula I.

The reaction mixture containing the alkoxy-modified silsesquioxane of Formula I, the compound according to Formula II, and the acid scavenger is allowed to react for about 0.1 to about 20 hours at a temperature of about 0 to about 100° C. The reaction may be allowed to take place in a solvent. Suitable solvents include aromatic solvents such as benzene, toluene, xylene, and chlorobenzene; cycloaliphatic solvents such as cyclohexane, cycloheptane; as well as ethers, and mixtures thereof.

In a second embodiment, a blocked-mercapto alkoxy-modified silsesquioxane is formed by a process comprising combining:

a. one or more compounds selected from the group consisting of alkoxy-modified silsesquioxanes having the formula III

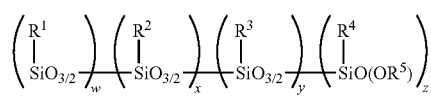

b. an unsaturated blocked mercapto compound, and
c. a reaction catalyst, wherein w, x, y and z represent mole fractions, z does not equal zero, w, x, or y but not all can be zero, and w+x+y+z=1.00; wherein $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, (iv) $R^6X^1$, and (v) $R^6X^1R^7Z$; wherein $X^1$ is selected from the group consisting of Cl, Br, SH, $S_aR^8$, $NR^8{}_2$, $OR^8$, $CO_2H$, $SCOR^8$, $CO_2R^8$, OH, olefins, epoxides, amino groups, vinyl groups, acrylates and methacrylates; wherein at least one of $R^1$, $R^2$, $R^3$ and $R^4$ is H; wherein a=1 to about 8; Z is independently selected from NH, $NR^8$, O, and S; $R^6$ is selected from the group consisting of alkylene groups having one to about 20 carbon atoms, cycloalkylene groups having 3 to about 20 carbon atoms, and a single bond; $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms; and $R^7$ is selected from alkyl groups having one to about 6 carbon atoms.

The alkoxy-modified silsesquioxane of Formula III may be produced by the same method as the alkoxy-modified silsesquioxane of Formula I described above. The difference between Formula III and Formula I is that at least one of $R^1$, $R^2$, $R^3$ and $R^4$ in the alkoxy-modified silsesquioxane of Formula III is H, whereas at least one of $R^1$, $R^2$, $R^3$ and $R^4$ in the alkoxy-modified silsesquioxane of Formula I is SH. The H can be incorporated into the alkoxy-modified silsesquioxane of Formula III, for example, by the co-hydrolysis and co-condensation of an alkyltrialkoxysilane or an alkyltrichlorosilane with, for example, an alkoxysilane. Exemplary alkoxy silanes include, but are not limited to, trimethoxysilane, triethoxysilane, and the like, and mixtures thereof.

Exemplary alkyltrialkoxysilanes and alkyltrichlorosilanes are those described above in reference to Formula I.

The alkoxy-modified silsesquioxane of Formula III is usually a mixture of oligomers of all sizes, from which one or more compounds of specific size or molecular weight can be separated from the mixture by known methods, such as chromatography and the like. Suitably, these one or more compounds are alkoxy-modified silsesquioxanes. For example, such alkoxy-modified silsesquioxanes can include, but are not limited to, octyl alkoxy-modified silsesquioxanes, phenyl alkoxy-modified silsesquioxanes, 2-chloropropyl alkoxy-modified silsesquioxanes, 2-mercaptopropyl alkoxy-modified silsesquioxanes, and the like, and mixtures of any of these.

A feature of the alkoxy-modified silsesquioxane of Formula III is the presence of a reactive alkoxysilyl group "z" attached to one or more alkoxy-modified silsesquioxane "w", "x", and/or "y" groups. In the alkoxy-modified silsesquioxane of Formula III, any of w, x or y, but not all, can be zero. The mole fraction of the one or more w, x, y or z groups is calculated as the mole fraction of w, x, y or z divided by the sum of the mole fractions w+x+y+z. Suitably, ratios of the w mole fraction (or the ratio of the x, y or z mole fraction) to the sum of the w+x+y+z fraction can range from about 0.01 to about 0.995. The mole fractions of w, x, y and z also can be measured through the mole fractions of $R^1$, $R^2$, $R^3$ and $R^4$ if the relative abundance of those groups can be measured. The sum of the mole fractions w, x, y and z is always equal to one, and z is never zero.

The individual weight fractions of w, x, y and z in Formula III can be calculated as described above in reference to Formula I.

To make a blocked-mercapto alkoxy-modified silsesquioxane according a second embodiment, the alkoxy-modified silsesquioxane of Formula III is reacted with an unsaturated blocked mercapto compound and a reaction catalyst.

As used herein, an "unsaturated blocked mercapto compound" is any mercapto compound that contains at least one carbon-carbon double bond and a blocking moiety that blocks the mercapto part of the molecule (i.e., the mercapto hydrogen atom is replaced with another group, hereafter referred to as a "blocking group"). Exemplary unsaturated blocked mercapto compounds include, but are not limited to, those that have the formula $CH_2=CH(CH_2)_nSCOR^{10}$, wherein n is from 0-20 and $R^{10}$ is selected from the group consisting of alkyl groups having one to about 20 carbon atoms, cycloalkyl groups having 3 to about 20 carbon atoms, and alkylaryl groups having 7 to about 20 carbon atoms. In the aforementioned exemplary unsaturated blocked mercapto compound, the blocking group is an acetyl compound.

The amount of unsaturated blocked mercapto compound added to the mixture containing the alkoxy-modified silsesquioxane of Formula III may be from about 1 to about 10, alternatively from about 1.5 to about 8, or alternatively from about 2 to about 6 moles per mole of Si—H groups present in Formula III.

The reaction catalyst that is combined with the alkoxy-modified silsesquioxane of Formula III and the unsaturated blocked mercapto compound to form the blocked-mercapto alkoxy-modified silsesquioxane is one that allows for a reaction between the at least one carbon-carbon double bond in the unsaturated blocked mercapto compound and the at least one Si—H group in the alkoxy-modified silsesquioxane of Formula III. Exemplary reaction catalysts include, but are not limited to, platinum-containing compounds and peroxides. Suitable platinum-containing compounds include, but are not limited to, chloroplatinic acid. Suitable peroxides include, but are not limited to, t-butylperbenzoate and benzoyl peroxide.

If the reaction catalyst comprises a platinum-containing compound, the amount of reaction catalyst to be added may range from about 0.001 to about 0.5, alternatively from about 0.01 to about 0.4, or alternatively from about 0.1 to about 0.3 moles per mole of Si—H groups present in Formula III. If the reaction catalyst comprises a peroxide, the amount of reaction catalyst to be added may range from about 0.2 to about 10, alternatively from about 0.5 to about 8, or alternatively from about 1 to about 6 moles per mole of Si—H groups present in Formula III.

The reaction mixture containing the alkoxy-modified silsesquioxane of Formula III, the unsaturated blocked mercapto compound, and the reaction catalyst is allowed to react for about 0.1 to about 100 hours, or for about 3 to about 48 hours, or for about 5 to about 24 hours, at a temperature of about 25 to about 130° C.

In a third embodiment, a method of forming a blocked-mercapto alkoxy-modified silsesquioxane comprises combining:

a. one or more compounds selected from the group consisting of alkoxy-modified silsesquioxanes having the formula IV

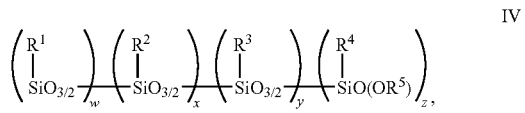

b. one or more compounds having the formula V

d.
and
c. a reaction catalyst, wherein w, x, y and z represent mole fractions, z does not equal zero, w, x, or y but not all can be zero, and w+x+y+z=1.00; wherein $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, (iv) $R^6X^1$, and (v) $R^6X^1R^7Z$; wherein $X^1$ is selected from the group consisting of Cl, Br, SH, $S_aR^8$, $NR^8_2$, $OR^8$, $CO_2H$, $SCOR^8$, $CO_2R^8$, OH, olefins, epoxides, amino groups, vinyl groups, acrylates and methacrylates; wherein at least one of $R^1$, $R^2$, $R^3$ and $R^4$ is $R^6X^1$ where $X^1$ is a vinyl group; wherein a=1 to about 8; Z is independently selected from NH, $NR^8$, O, and S; $R^6$ is selected from the group consisting of alkylene groups having one to about 20 carbon atoms, cycloalkylene groups having 3 to about 20 carbon atoms, and a single bond; $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms; $R^7$ is selected from alkyl groups having one to about 6 carbon atoms; $R^{11}$, $R^{12}$ and $R^{13}$ are the same or different and selected from the group consisting of alkyl groups having one to about 20 carbon atoms, cycloalkyl groups having 3 to about 20 carbon atoms, alkylaryl groups having 7 to about 20 carbon atoms, and $R^6B$; wherein B is a blocked mercapto compound; and at least one of $R^{11}$, $R^{12}$ and $R^{13}$ is $R^6B$.

The alkoxy-modified silsesquioxane of Formula IV may be produced by the same method as the alkoxy-modified silsesquioxane of Formula I described above. The difference between Formula IV and Formula I is that at least one of $R^1$, $R^2$, $R^3$ and $R^4$ in the alkoxy-modified silsesquioxane of Formula IV comprises a $R^6X^1$ group, where $X^1$ is a vinyl group, whereas at least one of $R^1$, $R^2$, $R^3$ and $R^4$ in the alkoxy-modified silsesquioxane of Formula I is SH. The vinyl group can be incorporated into the alkoxy-modified silsesquioxane of Formula IV, for example, by the co-hydrolysis and co-condensation of an alkyltrialkoxysilane or an alkyltrichlorosilane with, for example, a vinyltrialkoxysilane. Exemplary vinyltrialkoxysilanes include, but are not limited to, vinyltrimethoxysilane, vinyltriethoxysilane, and mixtures thereof.

Exemplary alkyltrialkoxysilanes and alkyltrichlorosilanes are those described above in reference to Formula I.

The alkoxy-modified silsesquioxane of Formula IV is usually a mixture of oligomers of all sizes, from which one or more compounds of specific size or molecular weight can be separated from the mixture by known methods, such as chromatography and the like. Suitably, these one or more compounds are alkoxy-modified silsesquioxanes. For example, such alkoxy-modified silsesquioxanes can include, but are not limited to, octyl alkoxy-modified silsesquioxanes, phenyl alkoxy-modified silsesquioxanes, 2-chloropropyl alkoxy-modified silsesquioxanes, 2-mercaptopropyl alkoxy-modified silsesquioxanes, and the like, and mixtures of any of these.

A feature of the alkoxy-modified silsesquioxane of Formula IV is the presence of a reactive alkoxysilyl group "z" attached to one or more alkoxy-modified silsesquioxane "w", "x", and/or "y" groups. In the alkoxy-modified silsesquioxane of Formula IV, any of w, x or y, but not all, can be zero. The mole fraction of the one or more w, x, y or z groups is calculated as the mole fraction of w, x, y or z divided by the sum of the mole fractions w+x+y+z. Suitably, ratios of the w mole fraction (or the ratio of the x, y or z mole fraction) to the sum of the w+x+y+z fraction can range from about 0.01 to about 0.995. The mole fractions of w, x, y and z also can be measured through the mole fractions of $R^1$, $R^2$, $R^3$ and $R^4$ if the relative abundance of those groups can be measured. The sum of the mole fractions w, x, y and z is always equal to one, and z is never zero.

The individual weight fractions of w, x, y and z in Formula IV can be calculated as described above in reference to Formula I.

To make a blocked-mercapto alkoxy-modified silsesquioxane according a third embodiment, the alkoxy-modified silsesquioxane of Formula IV is reacted with one or more compounds having the Formula V and a reaction catalyst:

Formula V where $R^{11}$, $R^{12}$ and $R^{13}$ are the same or different and selected from the group consisting of alkyl groups having one to about 20 carbon atoms, cycloalkyl groups having 3 to about 20 carbon atoms, alkylaryl groups having 7 to about 20 carbon atoms, and $R^6B$; wherein B is a blocked mercapto compound and $R^6$ is selected from the group consisting of alkylene groups having one to about 20 carbon atoms, cycloalkylene groups having 3 to about 20 carbon atoms, and a single bond; and at least one of $R^{11}$, $R^{12}$ and $R^{13}$ is $R^6B$.

As used herein, a "blocked mercapto compound" is any mercapto compound that contains a blocking moiety that blocks the mercapto part of the molecule (i.e., the mercapto hydrogen atom is replaced with another group, hereafter referred to as a "blocking group"). Exemplary blocked mercapto compounds include, but are not limited to, those that have the formula $R^{14}SCOR^{15}$, wherein $R^{14}$ and $R^{15}$ may be the same or different and are selected from the group consisting of alkyl groups having one to about 20 carbon atoms, cycloalkyl groups having 3 to about 20 carbon atoms, and alkylaryl groups having 7 to about 20 carbon atoms. In the aforementioned exemplary unsaturated blocked mercapto compound, the blocking group is an acetyl compound. An exemplary compound according to Formula V is S-(octanoyl) mercaptan propyl dimethyl silane.

The amount of compound(s) having the structure according to Formula V that is added to the mixture containing the alkoxy-modified silsesquioxane of Formula IV may be from about 1 to about 10, alternatively from about 1.5 to about 8, or alternatively from about 2 to about 6 moles per mole of vinyl groups present in Formula IV.

The reaction catalyst that is combined with the alkoxy-modified silsesquioxane of Formula IV and the compound according to Formula V to form the blocked-mercapto alkoxy-modified silsesquioxane is one that allows for a reaction between the Si—H group in Formula V and the vinyl group(s) in the alkoxy-modified silsesquioxane of Formula IV. Exemplary reaction catalysts include, but are not limited to, platinum-containing compounds and peroxides. Suitable platinum-containing compounds include, but are not limited to, chloroplatinic acid. Suitable peroxides include, but are not limited to, t-butylperbenzoate and benzoyl peroxide.

If the reaction catalyst comprises a platinum-containing compound, the amount of reaction catalyst to be added may range from about 0.001 to about 0.5, alternatively from about 0.01 to about 0.4, or alternatively from about 0.1 to about 0.3 moles per mole of Si—H groups present in Formula V. If the reaction catalyst comprises a peroxide, the amount of reaction catalyst to be added may range from about 0.2 to about 10, alternatively from about 0.5 to about 8, or alternatively from about 1 to about 6 moles per mole of Si—H groups present in Formula V.

The reaction mixture containing the alkoxy-modified silsesquioxane of Formula IV, the compound having the structure according to Formula V, and the reaction catalyst is allowed to react for about 0.1 to about 100 hours, or for about 3 to about 48 hours, or for about 5 to about 24 hours, at a temperature of about 25 to about 130° C.

The blocked-mercapto alkoxy-modified silsesquioxanes made using the methods disclosed herein consist essentially of "open" structures having the reactive alkoxysilyl group and are essentially free of pure closed caged polyhedral organosilsesquioxanes (POSS) structures that are known for use as nanoparticle fillers in various compounds. Without being bound by theory, it is believed that the methods of preparation of the blocked-mercapto alkoxy-modified silsesquioxane products, described above, precludes the formation of pure POSS structures because of the myriad of different geometric attachments that the rapid condensation of a trialkoxysilane generates. NMR spectra ranges for the amount of $^1H$ and/or $^{13}C$ in the products can also be determined, but these spectra will differ, depending on the various R groups attached to the structures, and are not illustrated here.

Another important feature of each of the blocked-mercapto alkoxy-modified silsesquioxanes made using the methods disclosed herein is that the reactive alkoxysilyl group is present in such a small amount that only a small amount of alcohol can be liberated by hydrolysis of the product. That is, the z alkoxysilyl group generates only about 0.05% to about 10% by weight alcohol when the product is treated by substantially total acid hydrolysis. Suitably, the amount of generated alcohol is about 0.5% to about 8% by weight and, suitably, the amount of generated alcohol is about 1% to about 6% by weight of the blocked-mercapto alkoxy-modified silsesquioxanes.

Therefore, the blocked-mercapto alkoxy-modified silsesquioxanes made using the methods disclosed herein are very suitable for use in rubber compositions in which silica is employed as a reinforcing filler. In particular, the reactive alkoxysilane group(s) attached to the blocked-mercapto alkoxy-modified silsesquioxanes can participate in the alkoxysilane-silica reaction and could improve silica dispersion in the rubber. The alkoxysilane-silica reaction produces alcohol as a by-product when alkyltrialkoxysilanes and/or alkoxysilane-terminated polymer groups are used for silica dispersion in rubber compounds. Usually, the trialkoxysilane employed is a triethoxysilane or a trimethoxysilane, and the generated alcohol is ethanol or methanol, respectively. Because these alcohol emissions add to the VOC emissions generated from processing of the other rubber tire components, the amount of reinforcing silica and concomitant amount of trialkoxysilane employed is governed and limited by government environmental regulations.

Without being bound by theory, it is believed that the limited amount of alcohol that is available in the blocked-mercapto alkoxy-modified silsesquioxanes produced by the methods disclosed herein make these compounds useful in rubber compositions. Not only may the use of such blocked-mercapto alkoxy-modified silsesquioxanes reduce the level of potential VOCs emitted as alcohol during compounding and further processing, it is believed that the limited amount of available unreacted alkoxysilane groups during and after mixing can limit the degree of potential blistering in the vulcanized rubber compounds and tires made from them. Moreover, it is believed that the use of the products of the disclosure could allow an increase in the amount of silica used for reinforcement.

The use of the blocked-mercapto alkoxy-modified silsesquioxanes in rubber compounds not only potentially reduces alcohol emissions during compounding and further processing of the rubber compared to other coupling and shielding agents, but these products also perform well as silica dispersing agents, potentially giving improved physical properties to the rubber stocks containing the compounds.

It was also discovered that the amount of alcohol released from the rubber compounds as VOC during compounding and further processing is zero to about 0.1% by weight, often zero to about 0.05% by weight of the rubber compound.

A rubber compound as described herein comprises (a) an elastomer; (b) a reinforcing filler comprising silica or a mixture thereof with carbon black; and (c) a blocked-mercapto alkoxy-modified silsesquioxane produced by any of the methods disclosed herein.

Because the blocked-mercapto alkoxy-modified silsesquioxane compounds contain such a small amount of the alkoxysilane z group and, thus, present a reduction in the alcohol that can be emitted during the alkoxysilane-silica reaction, the amount of silica present in the compound can, if desired, be increased from amounts in current usage. That is, the silica can be present in an amount of about 15 per hundred parts rubber (phr) to about 200 phr or more. The silica can also be present in an amount of about 15 phr to about 150 phr, about 15 phr to about 120 phr, about 30 phr to about 90 phr, about 60 phr to about 80 phr, and the like. The blocked-mercapto alkoxy-modified silsesquioxane can be present in an amount of about 0.1% to about 20% by weight based on the silica. The blocked-mercapto alkoxy-modified silsesquioxane can also be present in an amount of about 0.2 to about 15%, about 0.5 to about 10%, or about 1 to about 6% by weight based on the silica.

The rubber compounds are compounded with reinforcing fillers, such as silica, or a mixture of silica and carbon black. Examples of suitable silica reinforcing fillers include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultra fine, spherical particles. These primary particles strongly associate into aggregates, which in turn combine less strongly into agglomerates. The surface area, as measured by the BET method, gives the best measure of the reinforcing character of different silicas. For silicas of interest for the present disclosure, the surface area should be about 32 $m^2/g$ to about 400 $m^2/g$, with the range of about 100 $m^2/g$ to about 250 $m^2/g$, being preferred, and the range of about 150 $m^2/g$ to about 220 $m^2/g$ being most preferred. The pH of the silica filler is generally about 5.5 to about 7 or slightly over, preferably about 5.5 to about 6.8.

Some of the commercially available silicas that can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

The elastomers can be compounded with all forms of carbon black in a mixture with the silica. The carbon black can be present in amounts ranging from about one to about 100 phr, or from about 5 to about 50 phr, or from about five to about 35 phr, and the like. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the rubber compositions. Typical suitable carbon blacks are N-110, N-220, N-339, N-330, N-351, N-550, N-660, as designated by ASTM D-1765-82a. The carbon blacks utilized in the preparation of the rubber compositions can be in pelletized form or an unpelletized flocculent mass. Preferably, for more uniform mixing, unpelletized carbon black is preferred.

Certain additional fillers can be utilized as processing aids, including mineral fillers, such as clay (hydrous aluminum silicate), talc (hydrous magnesium silicate), aluminum hydrate [$Al(OH)_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, about one to about 20 phr and, about one to about 10 phr, and the like.

The elastomers that can be utilized in the rubber compositions of the disclosure include natural rubber or any solution polymerizable or emulsion polymerizable elastomer. Particularly suitable elastomers for use in the rubber compositions of the disclosure include, but are not limited to, styrene/butadiene copolymer, polyisoprene, polybutadiene, butadiene/isoprene copolymer, butadiene/isoprene/styrene terpolymers, isoprene/styrene copolymer, natural rubber, butyl rubber, halobutyl rubber, ethylene-propylene-diene rubber and combinations thereof.

It is readily understood by those having skill in the art that the rubber compositions can be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the rubber composition, the additives mentioned above are selected and commonly used in conventional amounts, in addition to other conventional rubber additives including, for example, other fillers, plasticizers, antioxidants, cure agents and the like, using standard rubber mixing equipment and procedures.

In one embodiment, a rubber composition is prepared by the steps of (a) mixing together at a temperature of about 130° C. to about 200° C. (drop temperature) in the absence of added sulfur and cure agents, an elastomer, a reinforcing filler comprising silica or a mixture thereof with carbon black, one or more blocked-mercapto alkoxy-modified silsesquioxane produced by the methods disclosed herein, (b) allowing the mixture to cool below the mixing temperature; (c) mixing the mixture obtained in step (b) at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes. The drop temperature for mixing together the components also can be about 145° C. to about 190° C. or about 155° C. to about 180° C.

The initial mixing step can include at least two substeps. That is, the initial mixing step can comprise the substeps of (i) mixing together at a temperature of about 130° C. to about 180° C., the elastomer, at least a portion of the silica, at least a portion of the blocked-mercapto alkoxy-modified silsesquioxane, (ii) cooling the mixture below the mixing temperature; and (iii) mixing the mixture obtained in step (ii) with the remainder of the silica, if any, and the remainder, if any of the blocked-mercapto alkoxy-modified silsesquioxane. The temperatures achieved by the at least two substeps can be the same or different from each other, within the temperature range.

The method can further include a remill step in which either no ingredients are added to the first mixture, or non-curing ingredients are added, in order to reduce the compound viscosity and improve the dispersion of the silica reinforcing filler. The drop temperature of the remill step is typically about 130° C. to about 175° C., especially about 145° C. to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., suitably about 60° C. to about 110° C. and, especially, about 75° C. to about 100° C.

Such rubber compositions, when vulcanized using conventional rubber vulcanization conditions, may exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable rubber compositions of the present disclosure can be utilized to form tread stocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, sidewalls, body ply skims, bead fillers, apex, chafer, sidewall insert, wirecoat, inner liner, and the like The rubber compositions can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 7.5 phr, with a range of about 1.5 to about 5 phr being most preferred.

Accelerators are used to control the time and/or temperature required for vulcanization and to improve properties of the vulcanizate. The vulcanization accelerators used in the present disclosure are not particularly limited. Examples include thiazole vulcanization accelerators, such as 2-mercaptobenzothiazole, dibenzothiazyl disulfide, N-cyclohexyl-2-benzothiazole sulfenamide (CBS), N-tert-butyl-2-benzothiazole sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

Pneumatic tires comprising at least one component produced from a rubber composition of the disclosure may exhibit improved silica dispersion, and thus, may have improved tensile mechanical and dynamic viscoelastic properties.

The present disclosure will be described in more detail with reference to the following examples. The following examples are presented for purposes of illustration only and are not to be construed in a limiting sense.

EXAMPLES

Example 1

Preparation of an AMS-co-MPS (a Compound According to Formula I)

An AMS-co-MPS of octyltriethoxysilane and 3-mercaptopropyl trimethoxysilane was prepared by Gelest, Inc. according to the teachings disclosed in our U.S. patent application Ser. No. 11/387,569, filed Mar. 23, 2006. Analysis revealed that the AMS-co-MPS had 24.3 mol % of SH groups and 4.88 wt % sulfur. The AMS-co-MPS also had a latent ethanol content of 1.79 wt % and a latent methanol content of 1.71 wt %, as measured by the procedure in Rubber Chemistry and Technology, vol. 75, p. 215, 2002.

Example 2

Preparation of an Acetyl-Blocked-Mercapto Alkoxy-Modified Silsesquioxane 89.9 g (146.9 mmol of mercapto groups) of the AMS-co-MPS prepared in Example 1 and 101.2 g of cyclohexane were added to a 500 mL Erlenmeyer flask. When this solution mixture was cooled to 20° C., 15.85 g (156.6 mmol) of triethyl amine and 12.91 g (164.5 mmol) of acetyl chloride were slowly added and stirred. The temperature of the water bath surrounding the flask rose to 28° C. during the 15 minute addition time. After cooling to ambient temperature over the next hour, the solution was extracted 3 times with 150 mL of distilled water, dried over magnesium sulfate and vacuum stripped of the solvent to give 86.56 g of product.

Example 3

Preparation of a Blocked-Mercapto Alkoxy-Modified Silsesquioxane 10 g (16.34 mmol of mercaptan) of the AMS-co-MPS prepared in Example 1 was reacted with 2.3 g (16.34 mmol) of benzoyl chloride in the presence of 1.75 g (16.75 mmol) of sodium carbonate by stirring at 50° C. for 24 hours. Washing with water and drying gave 9.76 g of co-AMS from octyltriethoxysilane and S-(benzoyl) mercaptopropyl triethoxysilane that was chloride free, as shown by a negative Beilstein test.

Example 4

Preparation of a Blocked-Mercapto Alkoxy-Modified Silsesquioxane 10 g (16.34 mmol of mercaptan) of the AMS-co-MPS prepared in Example 1 was reacted with 2.23 g (16.34 mmol) of isobutyl chloroformate in the presence of 1.75 g (1.75 mmol) of sodium carbonate by stirring at 50° C. for 24 hours. After adding hexane and washing with water gave 9.42 g of co-AMS from octyltriethoxysilane and S-(isobutyl formyl) mercaptopropyl triethoxysilane that was chloride free, as shown by a negative Beilstein test.

Example 5

Preparation of a co-AMS from Octyltriethoxysilane and Triethoxysilane 24.89 g (90 mmol) of octyltriethoxysilane and 1.64 g (10 mmol) of triethoxysilane can be dissolved in 85 mL of absolute ethanol, 13.4 mL of distilled water, and 17.9 g of concentrated hydrochloric acid. The lower phase which will be formed over the next 24 hours can be removed with a separatory funnel and vacuum dried to give a quantitative yield of 15.4 g of the co-AMS of octyltriethoxysilane and triethoxysilane.

Example 6

Preparation of a Blocked-Mercapto Alkoxy-Modified Silsesquioxane 15.4 g (10 mmol of silicone hydride) of the co-AMS produced in Example 5 can be mixed with 2.0 g (10 mmol) of S-(octanoyl) allyl mercaptan and about 0.1 mL of a 0.1 N alcoholic solution of chloroplatinic acid. Heating for 2 hours at about 70-80° C. followed by another addition of chloroplatinic acid and heating will give an octyltriethoxysilane and S-(octanoyl) mercaptopropyl triethoxysilane. Conversion can be increased by repeating the addition of the allyl mercaptan, chloroplatinic acid and heating.

Example 7

Preparation of a Blocked-Mercapto Alkoxy-Modified Silsesquioxane 15.4 g (10 mmol of silicone hydride) of the co-AMS produced in Example 5 can be mixed with 2.0 g (10 mmol) of S-(octanoyl) allyl mercaptan and about 2 g of benzoyl peroxide. Heating for 20 hours at about 70-80° C. will give an octyltriethoxysilane and S-(octanoyl) mercaptopropyl triethoxysilane. The residue benzoic acid may be extracted from a toluene solution with dilute aqueous sodium hydroxide followed by drying over anhydrous magnesium sulfate. Conversion can be increased by repeating the addition of the allyl mercaptan, benzoyl peroxide and heating.

Example 8

Preparation of an AMS Compound According to Formula Iv

Octyltriethoxysilane (24.89 g, 90 mmol) and vinyl triethoxysilane (1.90 g, 10 mmol) can be dissolved in 85 mL of absolute ethanol, 13.4 mL of distilled water and 17.9 g of concentrated hydrochloric acid. The lower phase which will be formed over the next 24 hours can be removed with a separatory funnel and vacuum dried to give a yield of 15.7 g of the co-AMS of octyltriethoxysilane and vinyl triethoxysilane.

Example 9

Preparation of a Blocked-Mercapto AMS

The co-AMS of Example 8 (15.7 g, 10 mmol vinyl groups) can be mixed with S-(octanoyl) mercaptan propyl dimethyl silane (2.60 g, 10 mmol) and about 0.1 mL of a 0.1 N alcoholic solution of chloroplatinic acid. Heating for 2 hours at about 70-80° C. followed by another addition of the chloroplatinic acid and heating will give a blocked mercapto-AMS. Conversion can be increased by repeating the addition of the silane, chloroplatinic acid and heating.

Example 10

Preparation of a Blocked-Mercapto AMS

The co-AMS of Example 8 (15.7 g, 10 mmol vinyl groups) can be mixed with S-(octanoyl) mercaptan propyl dimethyl silane (2.60 g, 10 mmol) and about 2 g of benzoyl peroxide. Heating for 20 hours at about 70-80° C. will give a blocked mercapto-AMS. The residue benzoic acid may be extracted from a toluene solution with dilute aqueous sodium hydroxide followed by drying over anhydrous magnesium sulfate. Conversion can be increased by repeating the addition of the silane, benzoyl peroxide and heating.

Example 11

Use of an Acetyl-Blocked-Mercapto Alkoxy-Modified Silsesquioxane in a Silica-Filled Rubber Composition Silica-filled rubber compositions utilizing various silica coupling agents were prepared. Specifically, the acetyl-blocked-mercapto alkoxy-modified silsesquioxane produced in Example 2 was compared to a commonly used trialkoxysilylalkyl polysulfide silane coupling agent (triethoxysilylpropyl disulfide) and two co-AMS silanes produced according to the methods disclosed in our U.S. patent application Ser. No. 11/387,569. The rubber compositions were made according to Table 1. Rubber compositions D through G are compounds according to the disclosure. All amounts shown are parts per hundred rubber (phr).

TABLE 1

| Composition | A | B | C | D | E | F | G |
|---|---|---|---|---|---|---|---|
| Mixing Stage 1 | | | | | | | |
| SBR[1] | 116.88 | 116.88 | 116.88 | 116.88 | 116.88 | 116.88 | 116.88 |
| BR[2] | 15 | 15 | 15 | 15 | 15 | 15 | 15 |
| Silica | 37.33 | 37.33 | 37.33 | 37.33 | 37.33 | 37.33 | 37.33 |
| Carbon Black | 20 | 20 | 20 | 20 | 20 | 20 | 20 |
| Aromatic Oil | 8 | 8 | 8 | 8 | 8 | 8 | 8 |
| 6PPD[3] | 0.95 | 0.95 | 0.95 | 0.95 | 0.95 | 0.95 | 0.95 |
| Wax | 1 | 1 | 1 | 1 | 1 | 1 | 1 |
| Sorbitan Monooleate | 1.33 | 1.33 | 1.33 | 1.33 | 1.33 | 1.33 | 1.33 |
| Triethoxysilylpropyl Disulfide | 3.28 | | | | | | |
| AMS-co-MPS[4] | | 2.00 | | | | | |
| AMS-co-Oct-Mer[5] | | | 2.00 | | | | |
| Blocked Mercapto AMS of Example 2 | | | | 1.70 | 1.95 | 2.13 | 2.27 |
| Mixing Stage 2 | | | | | | | |
| Silica | 18.67 | 18.67 | 18.67 | 18.67 | 18.67 | 18.67 | 18.67 |
| Sorbitan Monooleate | 0.67 | 0.67 | 0.67 | 0.67 | 0.67 | 0.67 | 0.67 |
| Triethoxysilylpropyl Disulfide | 1.64 | | | | | | |
| AMS-co-MPS[4] | | 1 | | | | | |
| AMS-co-Oct-Mer[5] | | | 1 | | | | |
| Blocked Mercapto AMS of Example 2 | | | | 0.85 | 0.98 | 1.07 | 1.13 |
| Mixing Stage 3 | | | | | | | |
| Remill | | | | | | | |
| Mixing Stage 4 | | | | | | | |
| Sulfur | 2.3 | 2.9 | 2.9 | 2.9 | 2.9 | 2.9 | 2.9 |
| Zinc Oxide | 2.5 | 2.5 | 2.5 | 2.5 | 2.5 | 2.5 | 2.5 |
| N-tert-Butyl-2-benzothiazolesulfenamide | 0.8 | 0.8 | 0.8 | 0.8 | 0.8 | 0.8 | 0.8 |
| 2,2'-Dithiobis(benzothiazole) | 0.8 | 0.8 | 0.8 | 0.8 | 0.8 | 0.8 | 0.8 |
| N,N'-Diphenylguanidine | 1 | 1 | 1 | 1 | 1 | 1 | 1 |

[1] 25% styrene, −45° C. Tg, extended with 37.5 phr of aromatic oil
[2] 1% vinyl, −110° C. Tg
[3] N-(1,3 Dimethylbutyl)-N'-Phenyl-P-Phenylene-Diamine
[4] Co-AMS of octyltriethoxysilane and mercaptopropyl triethoxysilane
[5] Co-AMS of octyltriethoxysilane and octanoyl 3-mercaptopropyl triethoxysilane Table 2 shows various properties of the rubber compositions produced in Table 1. The Mooney viscosity measurement was conducted at 130° C. using a large rotor. The Mooney viscosity was recorded as the torque after the rotor has rotated for 4 minutes.

The dynamic viscoelastic testing properties were obtained from temperature sweep experiments conducted with a frequency of 31.4 rad/sec using 0.5% strain for the temperature ranging from −100° C. to −20° C., and a 2% strain for the temperature ranging from −20° C. to 100° C. The dynamic viscoelastic properties were also obtained from strain sweep experiments conducted at 50° C. and 0° C. with the strain sweeping from 0.25% to 14.75%. The measurements reported in Table 2 were taken at a strain of 2%. Viscoelastic properties were also obtained using a dynamic compression test and rebound tests. The dynamic compression test is a cylindrical button that has a diameter of 9.5 mm and a length of 15.6 mm. The sample is compressed under a static load of 2 kg before testing. After it reached an equilibrium state, the test started with a dynamic compression load of 1.25 kg at a frequency of 1 Hz. The sample was then dynamically compressed and extended, and the resultant displacement and hysteresis were recorded. The rebound test was conducted with a cylindrical specimen having a diameter of 38.1 mm and a thickness of 1.91 mm. The specimen is strained by impacting the test piece with an indenter which is free to rebound after the impact. Rebound is defined as the ratio of mechanical energy before and after impact. The specimens were preheated to the desired test temperature for 30 minutes before testing.

The tensile properties were measured using the standard procedure described in ASTM-D 412 at 25° C. The test specimens were nicked round rings with a dimension of 2.5 mm in thickness and with inside and outside diameters of 44 mm and 57.5 mm, respectively. A gauge length of 25.4 mm is used for the tensile test.

All specimens for the dynamic viscoelastic testing and tensile testing were cured for 15 minutes at 171° C.

TABLE 2

| Composition | A | B | C | D | E | F | G |
|---|---|---|---|---|---|---|---|
| Processing | | | | | | | |
| Mooney Viscosity | 79.8 | 85.9 | 79.3 | 90.4 | 88.1 | 84.3 | 80.7 |
| Viscoelastic Testing | | | | | | | |
| tan δ @ 50° C. (temp sweep) | 0.2141 | 0.1677 | 0.1970 | 0.1935 | 0.1895 | 0.1826 | 0.1883 |
| tan δ @ 50° C. (strain sweep) | 0.2243 | 0.1554 | 0.1952 | 0.1913 | 0.1903 | 0.1890 | 0.1726 |
| Dynamic Compression @ 50° C. | 0.2170 | 0.1666 | 0.1976 | 0.1898 | 0.1903 | 0.1900 | 0.1886 |
| Rebound @ 50° C. | 47.4 | 55.6 | 50.6 | 51.6 | 51.6 | 52.0 | 52.4 |
| tan δ @ 0° C. (temp sweep) | 0.2762 | 0.2707 | 0.2836 | 0.2799 | 0.2718 | 0.2709 | 0.2788 |
| tan δ @ 0° C. (strain sweep) | 0.2598 | 0.2369 | 0.2558 | 0.2600 | 0.2428 | 0.2566 | 0.2645 |
| Dynamic Compression @ 0° C. | 0.2053 | 0.2695 | 0.2406 | 0.2399 | 0.2349 | 0.2492 | 0.2480 |
| G' @ −20° C. (MPa) | 29.6 | 17.5 | 21.4 | 22.7 | 23.4 | 19.4 | 21.2 |
| G' @ 25° C. (MPa) | 11.10 | 6.86 | 8.44 | 8.85 | 9.50 | 7.64 | 8.25 |
| Tensile Testing | | | | | | | |
| Modulus @ 50% Elongation (MPa) | 1.59 | 1.35 | 1.43 | 1.47 | 1.52 | 1.47 | 1.47 |
| Modulus @ 3000% Elongation (MPa) | 9.62 | 10.46 | 9.1 | 9.73 | 10.28 | 9.93 | 10.07 |
| Tensile at Break (MPa) | 21.12 | 17.15 | 16.44 | 19.24 | 19.25 | 18.21 | 19.31 |
| Elongation at Break (%) | 538 | 429 | 466 | 499 | 481 | 471 | 483 |

As seen in Table 2, the compositions containing the acetyl-blocked-mercapto alkoxy-modified silsesquioxane produced in Example 2 (compositions D-G) have similar processing characteristics as the composition containing the triethoxysilylpropyl disulfide silane (composition A). In addition, when compared to the triethoxysilylpropyl disulfide silane, the acetyl-blocked-mercapto alkoxy-modified silsesquioxane produced in Example 2 has lower hysteresis and a lower G' at colder temperatures.

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

We claim:

1. A method of forming a blocked-mercapto alkoxy-modified silsesquioxane comprising combining:
   a. one or more compounds selected from the group consisting of alkoxy-modified silsesauioxanes having the formula I

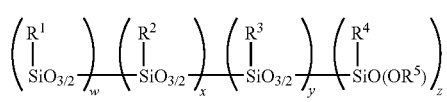

b. a compound having the formula II

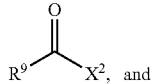

c. an acid scavenger,
   wherein w, x, y and z represent mole fractions, z does not equal zero, w, x, or y but not all can be zero, and w+x+y+z=1.00; wherein $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, and (iv) $R^6X^1$, and (v) $R^6X^1R^7Z$; wherein $X^1$ is selected from the group consisting of Cl, Br, SH, $S_aR^8$, $NR^8_2$, $OR^8$, $CO_2H$, $SCOR^8$, $CO_2R^8$, OH, olefins, epoxides, amino groups, vinyl groups, acrylates and methacrylates; wherein at least one of $R^1$, $R^2$, $R^3$ and $R^4$ is $R^6SH$; wherein a =1 to about 8; Z is independently selected from NH, $NR^8$, 0, and S; $R^6$ is selected from the group consisting of alkylene groups having one to about 20 carbon atoms, and cycloalkylene groups having 3 to about 20 carbon atoms, and a single bond; $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms; $R^7$ is selected from alkyl groups having one to about 6 carbon atoms; $R^9$ is selected from the group consisting of alkyl groups having one to about 20 carbon atoms, cycloalkyl groups having 3 to about 20 carbon atoms, alkylaryl groups having 7 to about 20 carbon atoms, and $OR^8$; and $X^2$ is selected from the group consisting of $CO_2R^8$ and halogen.

2. The method of claim 1, wherein said alkoxy-modified silsesquioxane of formula I is formed by a process comprising, combining as a reaction mixture
   a. water,
   b. alcohol,
   c. an alkyltrialkoxysilane, an alkyltrichlorosilane, or a mixture thereof,
   d. a mercaptoalkyltrialkoxy silane, and
   e. a hydrolysis and condensation catalyst.

3. The method of claim 2, wherein said alkyltrialkoxysilane is selected from the group consisting of octyltriethoxysilane, octyltrimethoxysilane, cyclohexyltriethoxysilane, isobutyltriethoxysilane, ethyltrimethoxysilane, cyclohexyltributoxysilane, methyl-triethoxysilane, propyltriethoxysilane, hexyltriethoxysilane, heptyltriethoxysilane, nonyl-triethoxysilane, decyltriethoxysilane, n-dodecyltrialkoxysilane, octadecyltriethoxysilane, methyltrimethoxysilane, propyltrimethoxysilane, hexyltrimethoxysilane, heptyl-trimethoxysilane, nonyltrimethoxysilane, octadecyl-trimethoxysilane, 2-ethylhexyl-triethoxysilane, 3-mercaptopropyl trimethoxy silane, 3-mercaptopropyl triethoxy silane, 3-aminopropyl trimethoxy silane, 3-aminopropyl triethoxy silane, N-[3-(trimethoxysilyl)-propyl] ethylenediamine, N-[3-(triethoxysilyl)-propyl] ethylenediamine, and mixtures thereof.

4. The method of claim 2, wherein said alkyltrichlorosilane is selected from the group consisting of octyltrichlorosilane, cyclohexyltrichlorosilane, isobutyltrichlorosilane, ethyltrichlorosilane, methyltrichlorosilane, propyltrichlorosilane, hexyltrichlorosilane, heptyltrichlorosilane, nonyltrichlorosilane, octadecyltrichlorosilane, and mixtures thereof.

5. The method of claim 2, wherein said mercaptoalkyltrialkoxy silane is selected from the group consisting of mercaptopropyltrimethoxy silane, mercaptopropyltriethoxy silane, and mixtures thereof.

6. The method of claim 2, wherein said hydrolysis and condensation catalyst is selected from the group consisting of hydrochloric acid, sulfuric acid, phosphoric acid, sodium hydroxide, potassium hydroxide, lithium hydroxide, (1,8-diazabicyclo[5.4.0]undec-7-ene), imidazoles, guanidines, tin catalysts, titanium catalysts, and mixtures thereof.

7. The method of claim 1, wherein $X^2$ is chlorine.

8. The method of claim 1, wherein said compound having formula II is selected from the group consisting of acetic anhydride, acetyl chloride, benzoyl chloride, isobutyl chloroformate, and mixtures thereof.

9. The method of claim 1, wherein said acid scavenger is selected from the group consisting of triethylamine, sodium carbonate, and mixtures thereof.

10. The method of claim 1, further comprising combining: d. a solvent.

11. The method of claim 10, wherein the solvent is one or more solvents selected from aromatic solvents, cycloaliphatic solvents, or ethers, and mixtures thereof.

12. The method of claim 1, wherein the compound of formula II is present in an amount of about 0.3 to about 1.2 moles per mole of SH groups present in Formula I.

13. The method of claim 1, wherein the amount of the acid scavenger is about 1.0 to about 2.0 moles per mole of SH groups present in Formula I.

14. The method of claim 1, wherein the acid scavenger is a base.

15. A method of forming a blocked-mercapto alkoxy-modified silsesquioxane comprising combining:
   a. one or more compounds selected from the group consisting of alkoxy-modified silsesquioxanes having the formula I

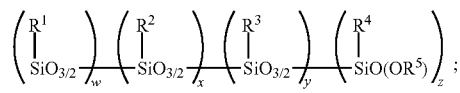

and
   b. a compound having the formula II

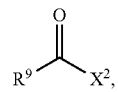

wherein w, x, y and z represent mole fractions, z does not equal zero, w, x, or y but not all can be zero, and w+x+y+z=1.00; wherein $R^1$, $R^2$, $R^3$ and $R^4$ are the same or different and selected from the group consisting of (i) H or alkyl groups having one to about 20 carbon atoms, (ii) cycloalkyl groups having 3 to about 20 carbon atoms, (iii) alkylaryl groups having 7 to about 20 carbon atoms, and (iv) $R^6X^1$, and (v) $R^6X^1R^7Z$; wherein $X^1$ is selected from the group consisting of Cl, Br, SH, $S_aR^8$, $NR^8_2$, $OR^8$, $CO_2H$, $SCOR^8$, $CO_2R^8$, OH, olefins, epoxides, amino groups, vinyl groups, acrylates and methacrylates; wherein at least one of $R^1$, $R^2$, $R^3$ and $R^4$ is $R^6SH$; wherein a=1 to about 8; Z is independently selected from NH, $NR^8$, 0, and S; $R^6$ is selected from the group consisting of alkylene groups having one to about 20 carbon atoms, and cycloalkylene groups having 3 to about 20 carbon atoms, and a single bond; $R^5$ and $R^8$ are independently selected from the group consisting of alkyl groups having one to about 20 carbon atoms, cycloalkyl groups having 3 to about 20 carbon atoms, and alkylaryl groups having 7 to about 20 carbon atoms; $R^7$ is selected from alkyl groups having one to about 6 carbon atoms; $R^9$ is selected from the group consisting of alkyl groups having one to about 20 carbon atoms, cycloalkyl groups having 3 to about 20 carbon atoms, alkylaryl groups having 7 to about 20 carbon atoms, and $OR^8$; and $X^2$ is selected from the group consisting of $CO_2R^8$ and halogen.

16. The method of claim 15, further comprising combining: c. a solvent.

17. The method of claim 16, wherein the solvent is one or more solvents selected from aromatic solvents, cycloaliphatic solvents, or ethers, and mixtures thereof.

18. The method of claim 15, wherein the compound of formula II is present in an amount of about 0.3 to about 1.2 moles per mole of SH groups present in Formula I.

19. The method of claim 1, comprising:
   scavenging acid from the reaction of a and b with the acid scavenger.

* * * * *